(12) United States Patent
Mair et al.

(10) Patent No.: US 10,826,974 B2
(45) Date of Patent: Nov. 3, 2020

(54) NETWORK BASED APPLICATION MANAGEMENT

(71) Applicant: BMC Software, Inc., Houston, TX (US)

(72) Inventors: Geoff Ross Mair, Vancouver (CA); Simon David Geddes, Vancouver (CA); Larry Vaughan Toube, Burnaby (CA)

(73) Assignee: BMC SOFTWARE, INC., Houston, TX (US)

( * ) Notice: Subject to any disclaimer, the term of this patent is extended or adjusted under 35 U.S.C. 154(b) by 33 days.

(21) Appl. No.: 16/166,883

(22) Filed: Oct. 22, 2018

(65) Prior Publication Data

US 2019/0124138 A1    Apr. 25, 2019

Related U.S. Application Data

(63) Continuation of application No. 15/211,883, filed on Jul. 15, 2016, now Pat. No. 10,110,665, which is a
(Continued)

(51) Int. Cl.
    *G06Q 10/10*      (2012.01)
    *H04L 29/08*      (2006.01)
    (Continued)

(52) U.S. Cl.
    CPC .............. *H04L 67/10* (2013.01); *G06F 8/60* (2013.01); *G06Q 10/107* (2013.01); *G06Q 50/01* (2013.01); *H04L 51/32* (2013.01)

(58) Field of Classification Search
    CPC ........ G06F 8/60; G06Q 10/107; G06Q 50/01; H04L 51/32
(Continued)

(56) References Cited

U.S. PATENT DOCUMENTS

| 7,032,022 B1 | 4/2006 | Shanumgam et al. |
| 2002/0095387 A1* | 7/2002 | Sosa ...................... G06Q 20/04 705/65 |

(Continued)

OTHER PUBLICATIONS

"Admin Guide—EFT", enterprise appZone by partnerpedia, Jan. 2, 2012, 11 pages.
(Continued)

*Primary Examiner* — Glenford J Madamba
(74) *Attorney, Agent, or Firm* — Brake Hughes Bellermann LLP

(57) ABSTRACT

An environment for facilitating the management of content for users associated with specific partner networks is provided. Users may be granted access to such specific partner networks in accordance with each user's affiliation with one or more organizations. In accordance with the above, a content management system facilitates the content/information exchange by accepting software applications from content providers. Additionally, the content management system accepts software application specifications or manifests from partner network administrators. Accordingly, the content management system can audit and recommend actions to users regarding applicable software application based one user organizational associations. Still further, the content management system can facilitate requests from affiliated users for specific types of content that can be forwarded to content providers and later made available to affiliated users.

12 Claims, 7 Drawing Sheets

Related U.S. Application Data continuation of application No. 13/359,236, filed on Jan. 26, 2012, now Pat. No. 9,396,499.

(60) Provisional application No. 61/436,916, filed on Jan. 27, 2011.

(51) Int. Cl.
*G06F 8/60* (2018.01)
*G06Q 50/00* (2012.01)
*H04L 12/58* (2006.01)

(58) Field of Classification Search
USPC .......................................................... 709/204
See application file for complete search history.

(56) References Cited

U.S. PATENT DOCUMENTS

| | | | |
|---|---|---|---|
| 2008/0098062 A1 | 4/2008 | Balia | |
| 2009/0299802 A1 | 12/2009 | Brennan | |
| 2009/0299993 A1* | 12/2009 | Novack | G06Q 10/06 |
| 2011/0277027 A1* | 11/2011 | Hayton | H04L 63/0815 |
| | | | 726/8 |

OTHER PUBLICATIONS

"Administration Guide", Partnerpedia Enterprise AppZone, Jun. 11, 2013, 39 pages.
"Device API", enterprise appZone by partnerpedia, 2010, 35 pages.
"MarketPlace 2010", partnerpedia, Apr. 13, 2010, 28 pages.

* cited by examiner

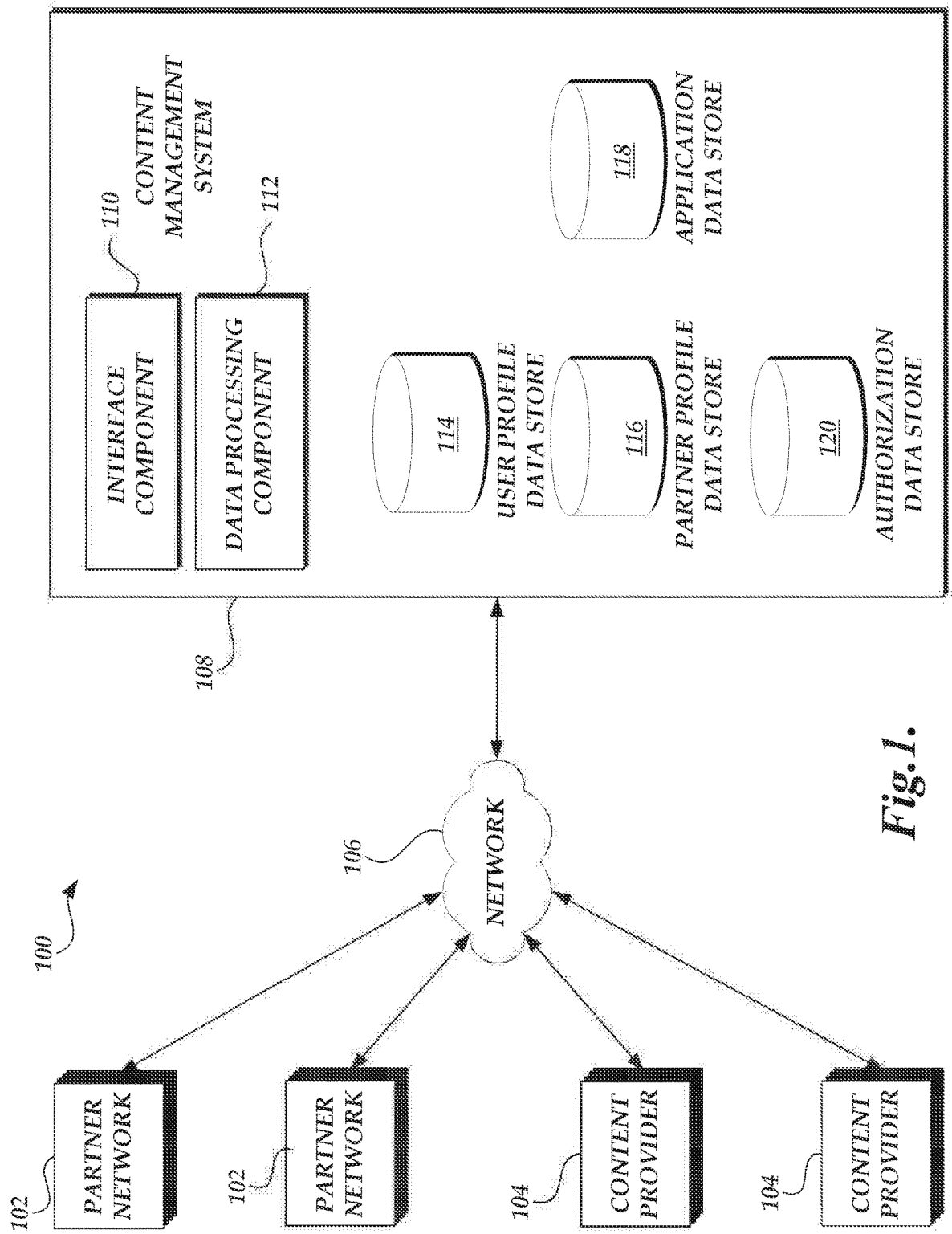

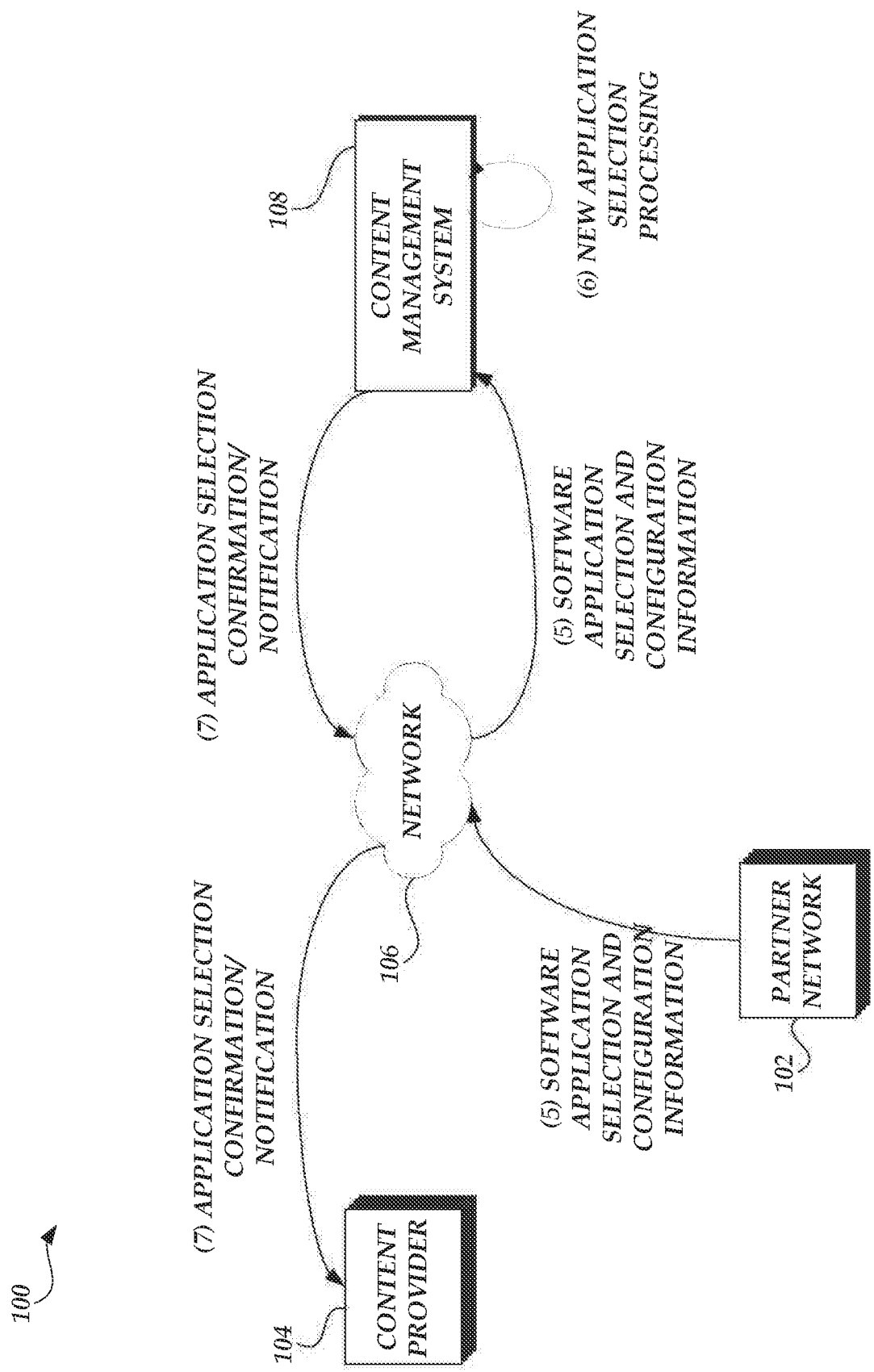

NETWORK BASED APPLICATION MANAGEMENT

CROSS-REFERENCE TO RELATED APPLICATIONS

This application is a continuation of U.S. application Ser. No. 15/211,883, filed Jul. 15, 2016, entitled "NETWORK BASED APPLICATION MANAGEMENT", which is a continuation application of U.S. application Ser. No. 13/359, 236, filed Jan. 26, 2012, now U.S. Pat. No. 9,396,499, which claims the benefit of U.S. Provisional Patent Application No. 61/436,916, filed Jan. 27, 2011, the entirety of which is incorporated herein by reference.

BACKGROUND

Generally described, computing devices and communication networks facilitate the collection and exchange of information. In a common application, computing devices, such as personal computing devices, can utilize a wide area communication network, generally referred to as the Internet, to access content or other data from other computing devices associated with content providing entities. The type of content exchanged between the computing devices can vary according to the specific design/function of the computing device and the type of content provided by the content providing entity.

Users can request data from a content providing entity that is delivered to one or more computing devices in a relatively "real time" basis. For example, users can transmit a request, or initiate a transaction, that results in the downloading or streaming of content to a computing device. Typically, the content providing entity would initiate such a transfer upon receipt of the request from the computing device.

Individual users can identify appropriate content providing entities in a number of ways. In one aspect, users can conduct searches via the communication network or other resources to identify appropriate content providing entities and initiate content requests. For example, a user may access a network resource, such as Web page, configured specifically to offer content for specific types of computing devices, operating systems, software applications, and the like. The specifically configured network resources are often referred to as "marketplaces" or "stores." Depending on the type of content providing entity involved, the results of such user initiated searches can vary. As such, a user may have difficulty identifying content providers that can provide specific content. Additionally, a user may have difficulty selecting from a group of content providers that are known to provide specified content. Similarly, content providers/content publishers may have difficulty identifying users interested in obtaining content or otherwise targeting specific classes of users or user types.

Even if content providing entities and content consumers are known to one another, the exchange of information between a content provider and a user of a device is typically individualized in that the individual user can control which applications are maintained on a device. For example, individuals may be establish an individual "online" relationship or confirm a relationship with network resources in order to exchange information or download software applications. An example of such embodiment corresponds to social network Web sites, in which individual users select the software applications that are downloaded or updated on their computing device, such as a mobile device. However, individualized content delivery approaches can become inefficient for facilitating the exchange of information between a user and a content providing entity based on the user's affiliation with an organization, such as a corporation. For example, an organization cannot typically manage the software applications that are made available to users for downloading via a network based marketplace or store.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 1 is a block diagram illustrative of a content management environment for use in facilitating the sharing of content based on user affiliations with partner networks;

FIGS. 3A and 3B are a block diagrams of the content management environment of FIG. 1 illustrating various embodiments for the creation of software application to be included in an information portal for sharing content between devices associated with partner networks;

DETAILED DESCRIPTION

Figure 2A:
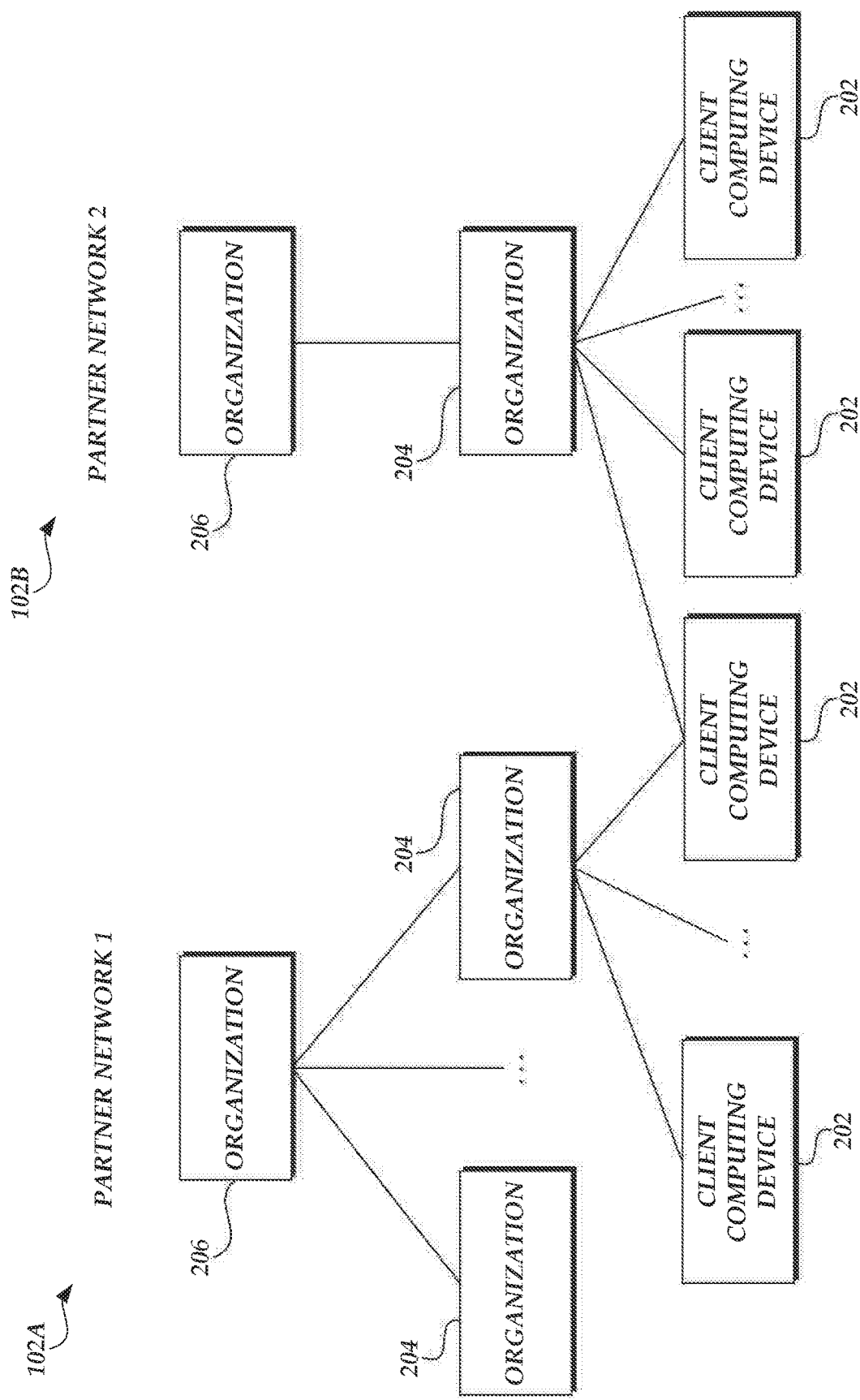
FIGS. 2A and 2B are block diagrams of illustrative partner networks.

Generally described, the present application is directed to an environment for sharing information. Specifically, the present application is directed toward an environment for facilitating the management of content, such as software applications, executable code, and the like, for users associated with, or otherwise affiliated with, specific partner networks. Illustratively, users are granted access to such specific partner networks in accordance with each user's affiliation with one or more organizations. Illustratively, affiliation with a partner network can include, but is not limited to, employment relationships, paid or unpaid memberships, registrations, and customer relationships.

In accordance with an illustrative embodiment, an affiliation with specific partner networks facilitates access to software applications that are selected or offered for download to affiliated user devices. Additionally, access to the specific partner network also illustratively facilitates management of software applications on the device by removal or modification of software application already loaded or stored on the device. In accordance with the above, a content management system facilitates the content/information exchange by accepting software applications from content providers. In this aspect, the content providers do not need to establish individual relationships with the end users and do not need to manage license fees, terms of service, etc. Additionally, the content management system accepts software application specifications or manifests from partner network administrators. Accordingly, the content management system can audit and recommend actions to users regarding applicable software application based one user organizational associations. Still further, the content management system can facilitate requests from affiliated users (or unaffiliated users) for specific types of content that can be forwarded to content providers and later made available to affiliated users.

As described above, access to software applications is made available to individual users according to their affiliation with one or more specific partner networks via access to a network based resource. Specifically, individual provider partner networks can maintain one or more information portals that interact with affiliated users for assessing software applications currently maintained on user devices, for identifying whether one or more software applications should be downloaded, or for identifying whether one or more software applications should be removed or modified from the device. The information portal can then facilitate the removal, modification, or addition of software applications on the user device. Additionally, as described above, the information portal can receive information from user devices regarding suggestions or configurations for software applications that are currently not available for download.

In one aspect, access to the information can be limited to at least a subsegment of users affiliated with an authorized consumer partner network. The subsets of information made available to such subsegment of users can be generally referred to as a partner program. For example, a first user affiliated with an organization may be associated with a partner program designed for a specific department within an organization, such as an accounting department. A second user affiliated with the same larger organization, but corresponding to a different department may be associated with a different partner program. Illustratively, the partner programs may maintain different software applications, may be associated with different security or terms of use for the same software application, and the like. Accordingly, while access to a partner network information portal may be based on affiliation information, the information made available to user devices may vary according to types or categories of affiliation (e.g., a premium paid membership vs. a free entry level membership).

Users affiliated with the authorized consumer partner network can then gain access to the partner program by virtue of their affiliation. Specifically, individual user access rights, or other permissions, are managed, at least in part, in accordance with the access rights/other permissions attributed to the identified affiliated partner network. Illustratively, the affiliation may be based on a user communication address, such as an email address, device identifiers, such as custom chipsets or embedded hardware identifiers, or other electronic identifiers, such as electronic tokens. Additionally, affiliation information may also be based on global unique identifiers, locally unique identifiers, group based identifiers, security passwords, biometric information, and the like.

Although the present application will be described with regard to specific system configurations, system components, illustrative interaction, and illustrative downloadable content, one skilled in the relevant art will appreciate that the embodiments disclosed are illustrative in nature and should not be construed as limiting.

FIG. 1 is a block diagram illustrative of a content management environment 100 for facilitating the sharing of content, such as software applications, between devices associated with partner networks. As illustrated in FIG. 1, the content management environment 100 includes a number of partner network components 102. As will be described below, each partner network component 102 logically corresponds to a collection of one or more users that can individually access information via a computing device and a communication network. The partner network component 102 can further include additional processing and computing devices that facilitate the interaction with user devices and content providers. In an illustrative environment, the partner network components 102 can exchange information via communication network 106, such as the Internet. However, the communication network 106 can correspond to any one of a variety of local communication networks or wide area communication networks including both private and public communication networks. While individual users may be logically associated with one or more partner networks, such individual users may be remote from a physical network. For example, individual users can be affiliated with specific partner network components 106 without utilizing any of the same physical communication network components or communication network service providers. Additionally, a particular partner network component 102 may not correspond to any particular physical network of computing devices. Rather, at least some partner network components 102 can relate to logical grouping of individual computing devices without any relation to the physical configuration or physical communication networking of the logically grouped computing devices.

The content management environment 100 can also include one or more content providers 104 for generating content, such as software applications or other executable code. The content providers 104 provide the content for delivery to the user of the partner networks 102 via the communication network 104. A particular content provider 104 may not correspond to any particular physical network of computing devices. Rather, at least some content providers 104 can relate to logical grouping of individual computing devices without any relation to the physical configuration or physical communication networking of the logically grouped computing devices. Additionally, one or more partner networks 102 and content providers 104 may correspond to a common organization or group of computing providing functionality both as a partner network for managing software applications to affiliated user devices and content provider for delivery content to partner networks.

With continued reference to FIG. 1, the content management environment 100 includes a content management system 108 for processing information between partner network components 102 and content providers 104. The content management system 108 includes an interface component 110 for obtaining information from users in each of the partner network components 102. The content management system 108 also includes a data processing component 112 for processing information request from users and generating specific information portals, or configurations of information portals, based on affiliation information or affiliation information types as defined by specific partner network components 102.

The content management system 108 can utilize a user profile data store 114 for maintaining individual user profiles. The content management system can also include a partner profile data store 116 for maintaining partner profiles that will be applied to, or correspond to, the information portals that will be made available to each user, at least in part, based on their affiliation with the partner network component 102. The content management system 108 can further include an application data store 118 for maintaining content, such as software code, executable code, configuration information, etc., provided by content providers 104 and to be shared with other partner network components 102. Still further, the content management system 108 includes an authorization data store 120 for maintaining information related to access rights, such as security information, identification information, terms of use, and the like, for content provided by content providers 104 to partner networks 102.

One skilled in the relevant art will appreciate that the data stores illustrated in FIG. 1 may be maintained in a single data store or distributed among several data stores. Additionally, one or more of the data stores may be implemented as Web services accessible via the communication network, such as via an Application Programming Interface ("API"). Still further, as will be explained in greater detail below, the data stores 114-120 can be implemented in accordance with multi-tenant embodiments. In such embodiments, software applications may be collectively stored or maintained in the data stores for a particular user or partner program component 102. At the same time, different selections of software applications or different configurations of software applications may be made available depending on the particular affiliations/environments utilized by the user to access the partner program data. Additionally, although the content management system 108 is illustrated as a grouping of components and data stores, one skilled in the relevant art will appreciate that the With reference now to FIGS. 2A and 2B, block diagrams of interactions or relationships between illustrative partner network components 102 (FIG. 1) for utilization within the content management system 108 (FIG. 1) will be described. As illustrated in FIG. 2A, individual users may be associated (either physically or through a network connection) with a computing device 202. The computing devices 202 utilized by the individual users of each partner network can correspond to a wide variety of devices or components that are capable of initiating, receiving or facilitating communications over a communication network including, but not limited to, personal computing devices, electronic book readers, hand held computing devices, integrated components for inclusion in computing devices, consumer electronics, appliances, electronic devices for inclusion in vehicles or machinery, mobile telephones, modems, personal digital assistants, laptop computers, gaming devices, and the like.

Based on organizational criteria, the users are eventually associated with one or more partner network components, illustratively partner network components 102A and 102B. The organizational criteria can be based on employment criteria, subscriptions, inferential criteria, memberships, customer relationships, and the like. To determine, the partner network component 102 affiliations, and as illustrated in FIG. 2A, each computing device 202 is affiliated at a first level with one or more organizations 204. In turn, each organization 202 can further correspond to additional levels of organizational criteria, such as organizations 204. Accordingly, individual users can be affiliated with a number of organizational entities according to vertical hierarchies. Although partner network components 102A and 102B are illustrated with regard to a three-tiered organizational hierarchy, one skilled in the relevant art will appreciate that a partner network component 102 may have one or more hierarchies and that each partner network component 102 may have different organization structures or utilize different organizational criteria to define organizational hierarchies.

Figure 2B:
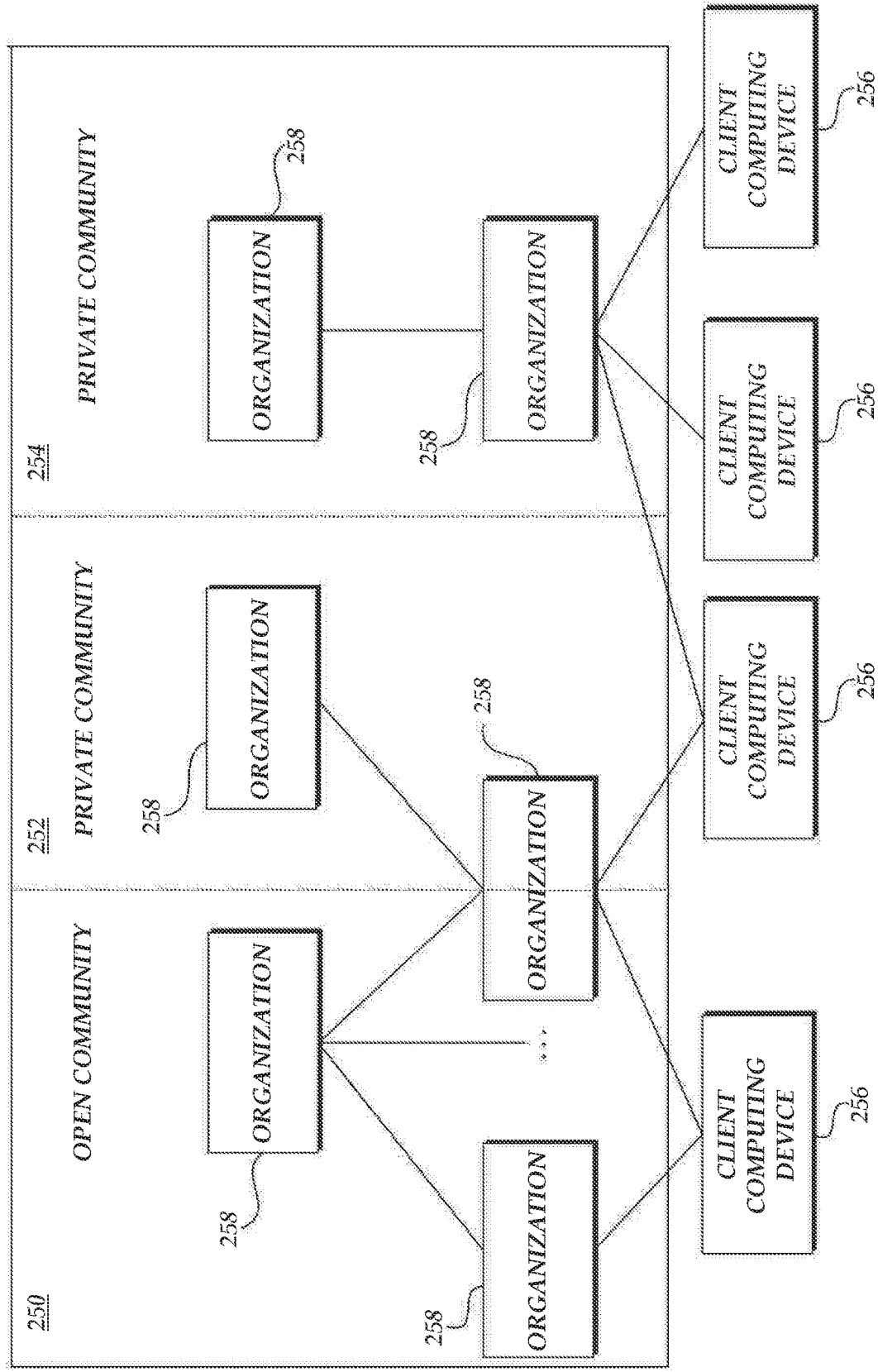

Turning now to FIG. 2B, in addition to classification or affiliation of users to one or more organizations, in an illustrative embodiment, provider partner network component 102 information may be provided to users affiliated with one or more organizations with varying scope. Specifically, in an illustrative embodiment, partner network information may be characterized into one or more logical networks based on classifications of users. For example, a "public" network may be defined for the general population of users associated with a particular partner network component 102 or all users of the content management system 108. In another example, a "private" network may be defined that limits users according to their affiliated partner network component 102. Additionally, the "private" networks can further subdivide users within a partner network component 102 (e.g., "employees" vs. "executives" vs. "top management").

As illustrated in FIG. 2B, a particular provider partner network component 102 has defined three logical networks 250, 252, 254. Similar to FIG. 2A, each computing device 256 is affiliated with one or more organizations 258. The first level organizations 258 can further be affiliated in accordance with a hierarchical structure. With regard to logical network 250, the "public" network, all users affiliated with a partner network component 120 may have access. With regard to logical networks 252 and 254, a more limited subset of users would have access to the partner information. In one embodiment, each user may be forced into a single user characterization (e.g., either "employee," "executive," or "top management"). In another embodiment, users may have multiple characterizations (e.g., all "top management" are "executives" and "employees"; all "executives" are also "employees"; and everyone is an "employee"). Thus, a specific user may access partner information in different ways or access different partner information depending on the user characterization.

Figure 3A:
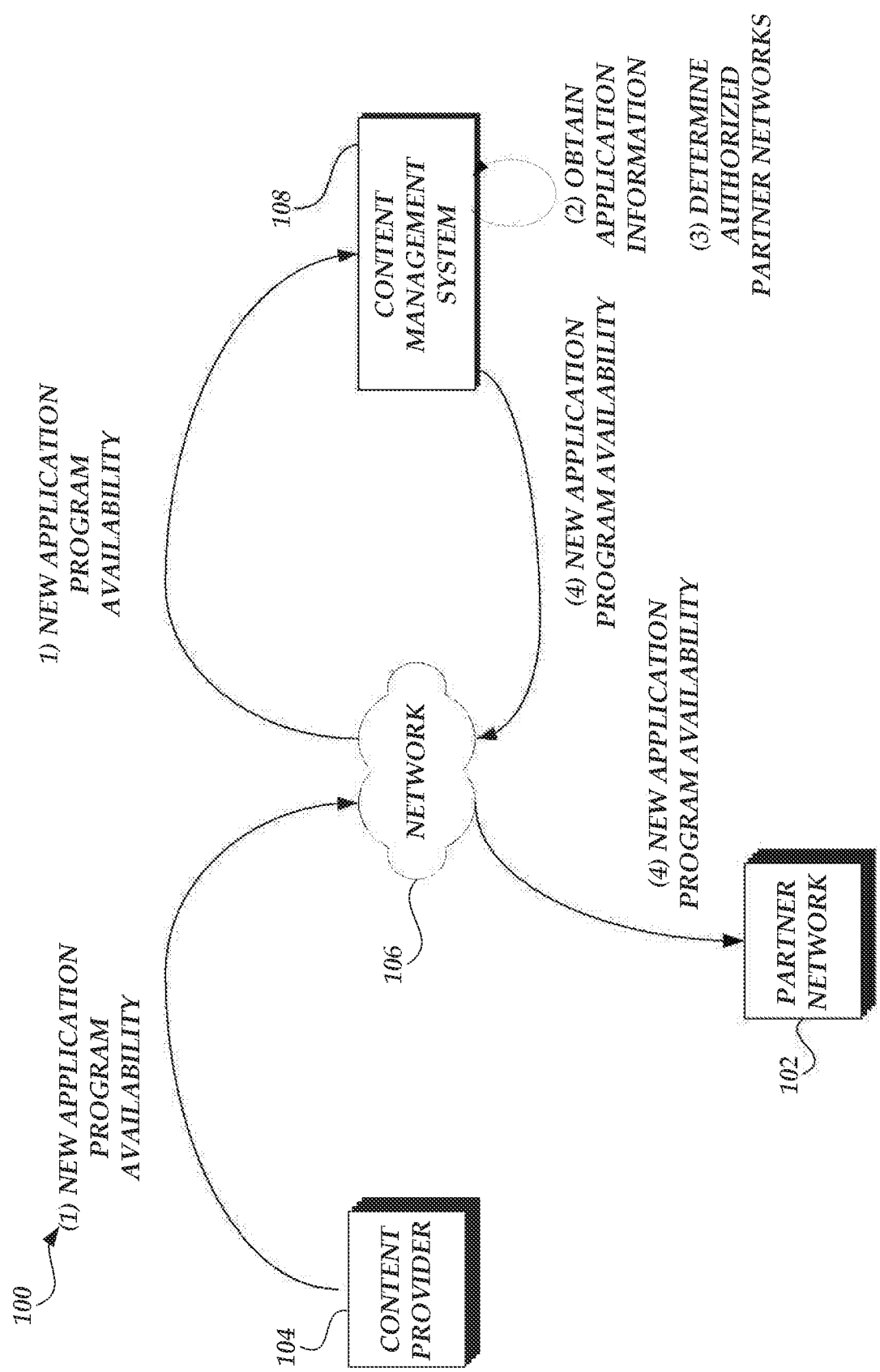

With reference now to FIGS. 3A and 3B, block diagrams of the content management environment 100 of FIG. 1 illustrating the provisioning of content for inclusion in information portals will be described. With reference to FIG. 3A, a content provider 104 generates new application program availability information that is transmitted over the communication network 106 to the content management system 108. Illustratively, the new application program availability information can be facilitated by access to a network resource, such as a Web site, provided by the content management system 108. The content management system 108 processes the new application program availability information by obtaining information that will be utilized to evaluate the provided software application by partner network administrators. Examples of the type of information that will be included in a new application program can include, but are not limited to, contact information, descriptive information, security information, pricing information, licensing information, identification of particular partner networks, and the like. The software application can be included in the new application program availability information or access can be provided to applicable software application programs.

After obtaining and processing the new application program availability information, the content management system 108 then determines partner network authorization information. Illustratively, the authorization information can correspond to various aspects related to the identification of which partner networks may provide the application program. In one aspect, the authorization information relates to the specification, by the content providers 104, of which partner network components 102 may have access to the software application and the terms of such access. For example, the authorization information can establish that specific authorized partner network components 102 will only be able to access a subset of the program information based a number of available licenses or other restrictions set by the content provider 104. Still further, the authorization information can also establish different subsets of program information according to characterization of users affiliated with the specified partner network component 102. For example, the content provider 104 can specify various levels of service (e.g., gold, silver, and bronze) that dictate that type of software application or support that the users will received. As discussed above, users associated with such partner networks 102 will then be limited as to which software application (or version of a software application) will be provided via the information portal.

Based on the identification of which partner networks may have availability to the software applications, the content management system 108 provides new application program availability information to one or more partner networks 102. The new application program availability information can include the information provided by the content provider 104 as well as additional information generated, or otherwise obtained from, the content management system 108. The new application program availability information can include information that can facilitate the selection of new application programs, including, but not limited to, pricing, software application and content provider ratings, other reputation information, content provider history (general or specific), relationship information (e.g., the number of other partner networks that have offered the software application for download), deadline/timelines, marketing materials, integration information, and the like.

With reference to FIG. 3B, in embodiments in which a partner network selects a software application for inclusion in one or more information portals, the partner network transmits software application selection and configuration information to the content management system 108. Generally, the software application selection and configuration information can include information that relates to the specification, by the partner networks 102, of software applications that the users affiliated with the partner networks may have and the terms of such access. In one example, the software application selection and configuration information can establish which users or types of users affiliated with the partner network will be able to access software application program. In another example, the software application selection and configuration information can also establish different subsets of software application program for subset of users affiliated with the partner network. As discussed above, users associated with such partner networks 102 will then be limited as to which software application (or version of a software application) will be provided via the information portal. In a further example, the software application selection and configuration information can include software manifests or configurations that not identify which software applications are required to be loaded onto a device, which software application are prohibited on a device and which software applications may be optional. The authorization information may be keyed to specific software devices, manufacturers, users, operating systems, and the like. Still further, the software application selection and configuration information can include a specification of pricing terms or software licenses that dictate the financial considerations to be incurred by the partner network or users of the partner network if the software download occurs.

Once all the software application selection and configuration information is gathered, the content management system 108 can then send confirmation to the content provider 104 and partner networks 102. Additionally, the content management system 108 can initiate notifications to the user of the partner network component 102 via the communication network 106 that content is available. Illustratively, the notification can correspond to any one of a variety of notification methods and communication media, including, but not limited to, electronic mail, short message service, multi-media message service, micro-blogs, blogs, and the like.

Figure 4:
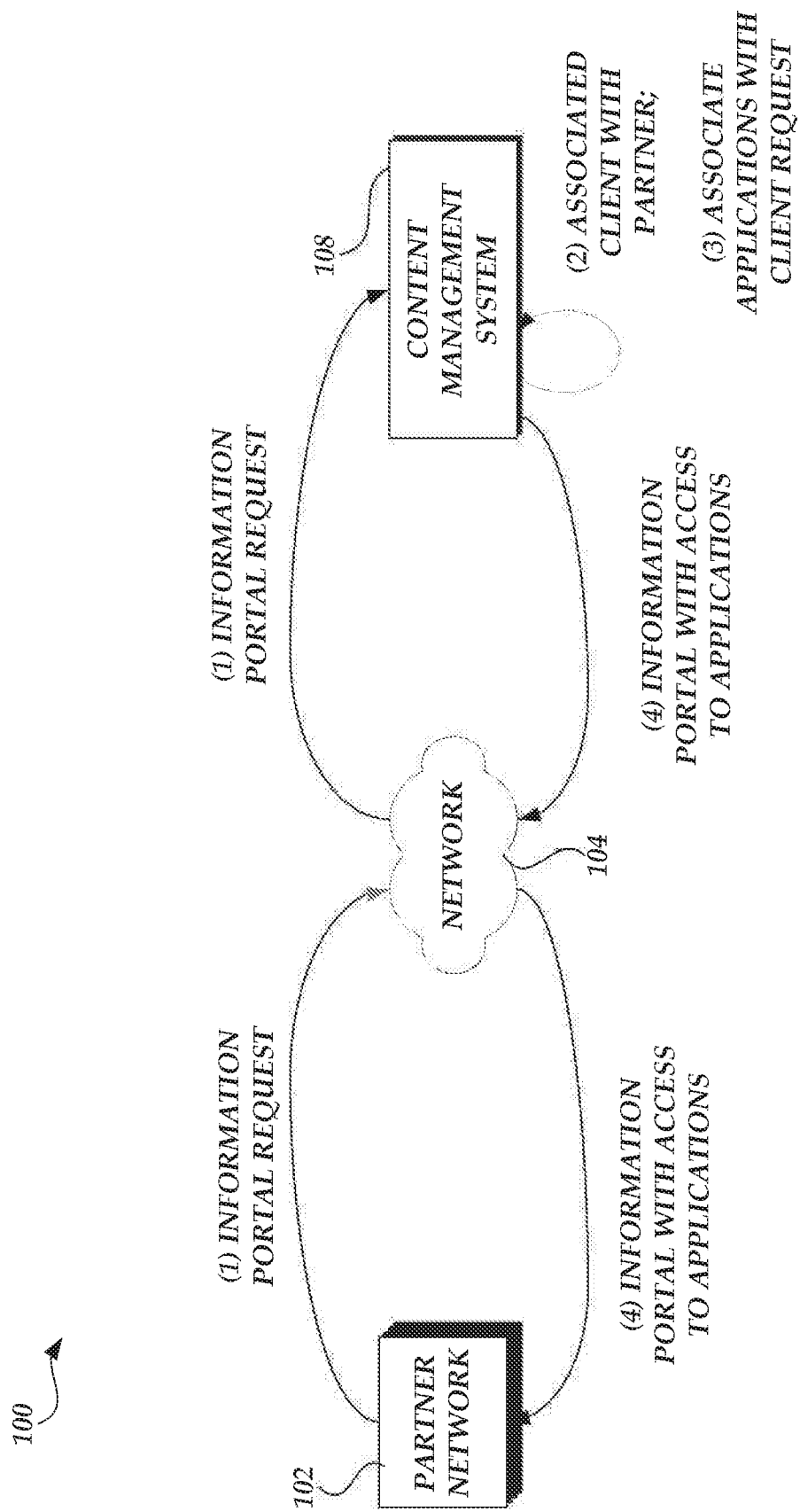
FIG. 4 is a block diagram of the content management environment of FIG. 1 illustrating various embodiments for the sharing of content between devices associated with partner networks via the generation of an information portal.

With reference now to FIG. 4, a block diagram of the content management environment 100 of FIG. 1 illustrating the sharing of content between devices associated with the partner network component 102 will be described. As illustrated in FIG. 4, a user associated with a partner network component 102 generates a new information portal request which is transmitted over the communication network 106 to the content management system 108. Illustratively, the new information portal request can be facilitated by access to a network resource, such as a Web site, provided by the content management system 108. An illustrative network resource will be described below. The content management system 108 processes the new information portal requires by associating the client with at least one partner network component 102.

Based on the association of at least one partner network component 102, the content management system 108 then associates information portal identifiers with the particular client request. Specifically, the content management system 108 determines the information portal identifiers authorized for the partner network(s) associated with the user. Based on this association, the content management system 108 then provides the user (through a client computing device) with an information portal that provides the user access to software application, executable code, or other content that have been made available based on the user's affiliation with partner networks 102. In one example, the content management system 108 can cause the generation of user interfaces on a client computing device associated with the requesting user. In another example, the content management system 108 can cause the automatic downloading of software to the client computing device 102 or other user device. In a further example, the content management system 108 can cause an audit of a client computing device for determination of available software applications or for determination of whether prohibited software applications should be removed or modified.

In an illustrative embodiment, the content management system 108 can filter the potentially applicable software applications according to the partner network profile of the associated partner network components 102. In one aspect, the content management system 108 can filter identified program information according to organizational affiliation information associated with a user. For example, assume a content provider 104 generates multiple versions or mutually exclusive software applications that may be made available to a partner network 102, such as a full version and a limited functionality version of a software application. In one aspect, the content provider 104 can specify criteria, such as business rules, such that users associated with specific partner network components 102 may be limited to one version. For example, if the criteria specify that a particular partner network component 102 may only have access to limited version of the software application, all users associated with that specific partner network component 102 would be provided access only to the limited version. Accordingly, the content management system 108 would filter, or otherwise prevent, the full version from appearing as an available download for user devices.

In another aspect, the content management system 108 can further filter the identified program information according to additional organizational affiliation information associated with a user or a partner network component 102 affiliated with a user. With reference to the previous example regarding the full and limited version of a software application, assume that users associated with the partner network component 102 can be characterized as public users, a first level of users, and a second level of users. Depending on the characterization of the user or the user's affiliation with the partner network component 102, the user would be further limited as to which version of a software application would be made available. As previously discussed, in one illustrative example, users associated with different departments within the same organization may be provided different software manifests or software configurations. Accordingly, the content management system 108 would filter, or prevent the display of, content in accordance according to the user characterization.

Still further, in some embodiments, the partner network component 102 may allow one or more users to have multiple user characterizations (e.g., a public user and an executive). In this embodiment, the content management system 108 would filter the available software applications according to the specific user characterization identified by the content management system. For example, an information portal associated with a "public" user would include different or less software applications than an information portal associated with an "executive" user, even if it was the same user. In still a further embodiment, the partner network component 102 may allow one or more users to have multiple users characterizations based on devices accessing the partner networks 104. For example, an information portal associated with a dedicated computing device issued by an organization (e.g., a "work" mobile device) could include different software application than an information portal associated with a personal computing device (e.g., a "personal" mobile device).

In still a further embodiment, the generated information portal can be utilized to obtain software application requests by the end users 202 or other entities that are processed via the partner networks 102 to the content providers 104. For example, an information portal may include software applications in which no pricing has been set by the content provider and which cannot be downloaded. To obtain a download, the user affiliated with the partner network 102 may have to provide additional information (such as configuration information) that is provided to the content provider 104. In turn, the content provider 104 can customize the software application and subsequently make the software application available via the information portal. In another example, information portals may have feedback channels for suggesting new applications or application features that can be provided to the content providers.

In another aspect, the content management system 108 can manage the number of software licenses or billing information between the partner networks 102 and content providers 108. For example, the content management system 108 may have a financial relationship with each partner network 102 to be able to charge for information portal use. The content management system 108 can forward at least some portion of the fees charged to the content provider 104 and associated any service charges. In another example, the content management system 108 can facilitate referral fees that are charged to content providers 104 for receiving new software application requests or new software application recommendations. Similarly, the content management system 108 can forward at least some portion of the fees charged to the partner network 102 and associated any service charges Turning now to FIG. 5, an information portal request processing routine 500 implemented by a content management system 108 will be described. The information portal request processing routine 500 begins at block 502 with the content management system 108 obtaining an information portal request. Illustratively, a user associated with the partner network can access a user interface or other network resource provided by the content management system 108 via the communication network 106. Illustratively, the information portal request can include user identification information, such as login information, cookies, etc. Such information may be submitted upon approval/specification by the specific user or through the utilization of software application programs, such as a browser software application or a dedicated software application provided on a user device.

At block 504, based on the user identification information, the content management system 108 obtains client partner affiliations associated with the information portal request. In one embodiment, the content management system 108 can maintain the partner network affiliations in the user profile data store 114. Accordingly, the content management system 108 can obtain affiliation information based on the user identification information included in the information portal request.

If the partner network affiliation is not readily available, in an illustrative embodiment, the content management system 108 can parse information associated with a particular user to obtain identification information. For example, the content management system 108 can parse a domain name, or host name, from user contact information, such as an email address, to obtain affiliation information. Specifically, in one embodiment, the content management system 108 can maintain a data store, such as a database, of domain names that have been associated with partner network components 102 (e.g., "partner.com," "partner1.com," "partner.net," etc.). Each specific partner network component 102 can register domain names with the content management system 108. Additionally, the content management system 108 can also associate specific domains based on interactions with users known to be affiliated with the partner network component 102, such as through learned behaviors. For example, the content management system 108 can add or remove domains based on interactions with users known to be affiliated with specific partner network components 102.

In another embodiment, the content management system 108 can parse email addresses associated with user (either submitted in the information portal request or obtained otherwise) to identify keywords, such as partial domain names or hostnames. Using the parsed keywords, the content management system can then search a data store of known partner network names or identifiers to match the user with a partner network. In yet another embodiment, the content management system utilizes the email address provided, or otherwise associated with the user, to verify the affiliation information. In such an embodiment, upon associating the user with a partner network, the content management system 108 can forward a secure email to the user at the email address having the domain associated with the partner network component 102. The secure email can include a special resource identifier, such as a hyperlink, that accesses a domain provided by the content management system. The resource identifier can include embedded information, such as confirmation codes, expiration codes, etc., to prevent fraud. Additionally, the content management system 108 can require additional confirmation information or other steps via the domain accessed by the resource identifier. Based on accessing the resource identifier in the manner specified, the content management system 108 verifies the association of the user to the partner network component 102. Such secure links can allow the content management system 108 to associate a user to a partner network without require additional activity by the user. Further, the content management system 108 can leverage security procedures or protocols utilized by the partner network components 102 in managing the use of authorized email accounts.

Figure 5:
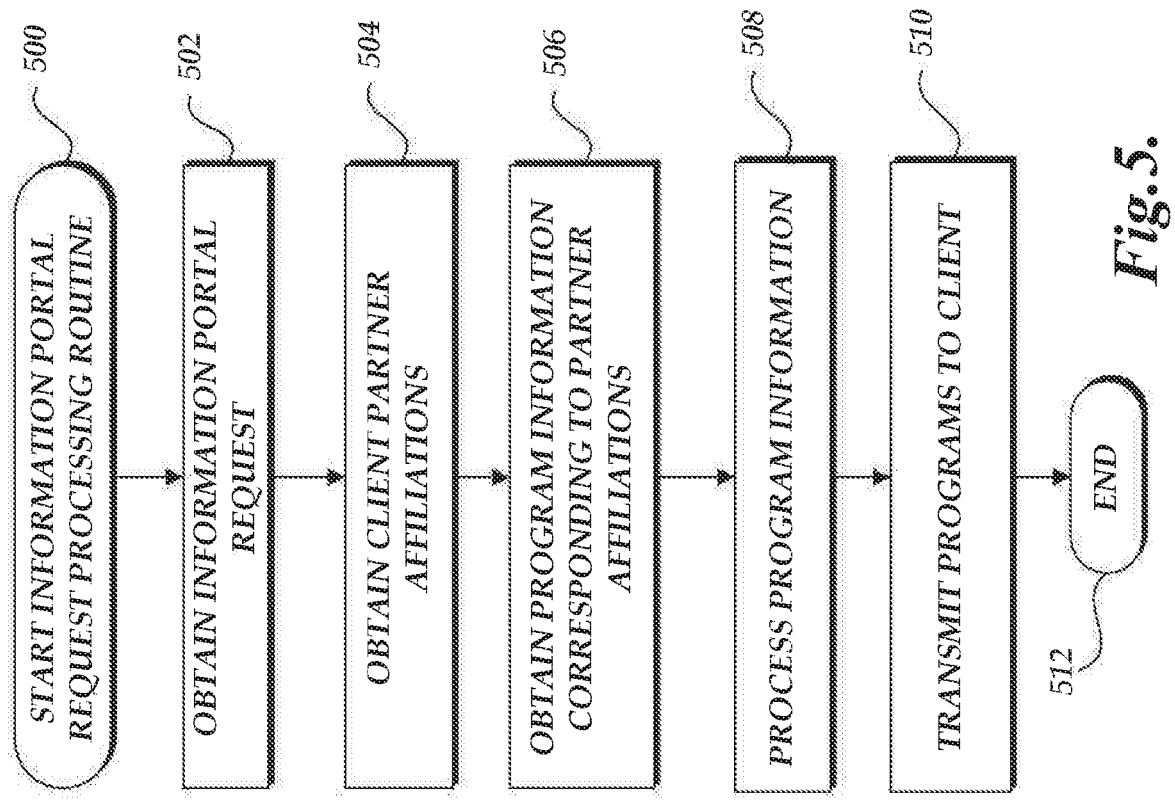
FIG. 5 is a flow diagram of an information portal request processing routine implemented by a content management system.

With continued reference to FIG. 5, based on the client partner affiliations obtained from the user profile data store 114 or otherwise obtained by the content management system 108, at block 506, the content management system then obtains the program information available to the user based on the partner affiliations. Illustratively, the content management system 108 may obtain all program information available to all users affiliated with the identified partner program component 102. Additionally, the content management system 108 can conduct an audit or otherwise obtain audit information regarding the software applications, operating system, or other configurations utilized by the requesting client computing device 102. Based on the audit, the content management system 108 can then determine which of the potentially applicable software applications made available to the partner network 102 will be provided or made available to the specific affiliated user of the partner network.

At block 508, the content management system 108 processes the program information such that a user can only access content, such as software applications, via the information portal as allowed by any user of the particular partner network 102. Additionally, the content management system can also filter the program information based on individual user criteria or based on the identity of the individual user. For example, the content management system 108 can further filter program information depending on a characterization of a user or a user's selection of a particular characterization. Still further, the content management system 108 can further apply financial criteria that may limit the software applications provided to a user based on financial terms incurred by the affiliated partner network 102 or user of the partner network. For example, the content management system 108 may allow partner networks to specify a total financial obligation for particular users or types of users that may limit the number of software applications made available to the users. Additionally, the content management system 108 may allow partner networks 102 to specify total financial obligations for the partner network that may limit software applications made available to individual users based on the cumulative financial obligation of the affiliated partner network.

At block 510, the content management system 108 can then transmit responsive information portal information via the communication network. In one example, a user interface or other notification mechanism (e.g., SMS, MMS, email) may be generated that allows users to select one or more software applications for download. In another example, the content management system 108 can initiate the download of software applications, removal of software applications or modification of software applications on the client computing device. In a further example, the content management system 108 may generate notifications to software delivery services to make software application available to users. At block 512, the routine 500 terminates.

Figure 6:
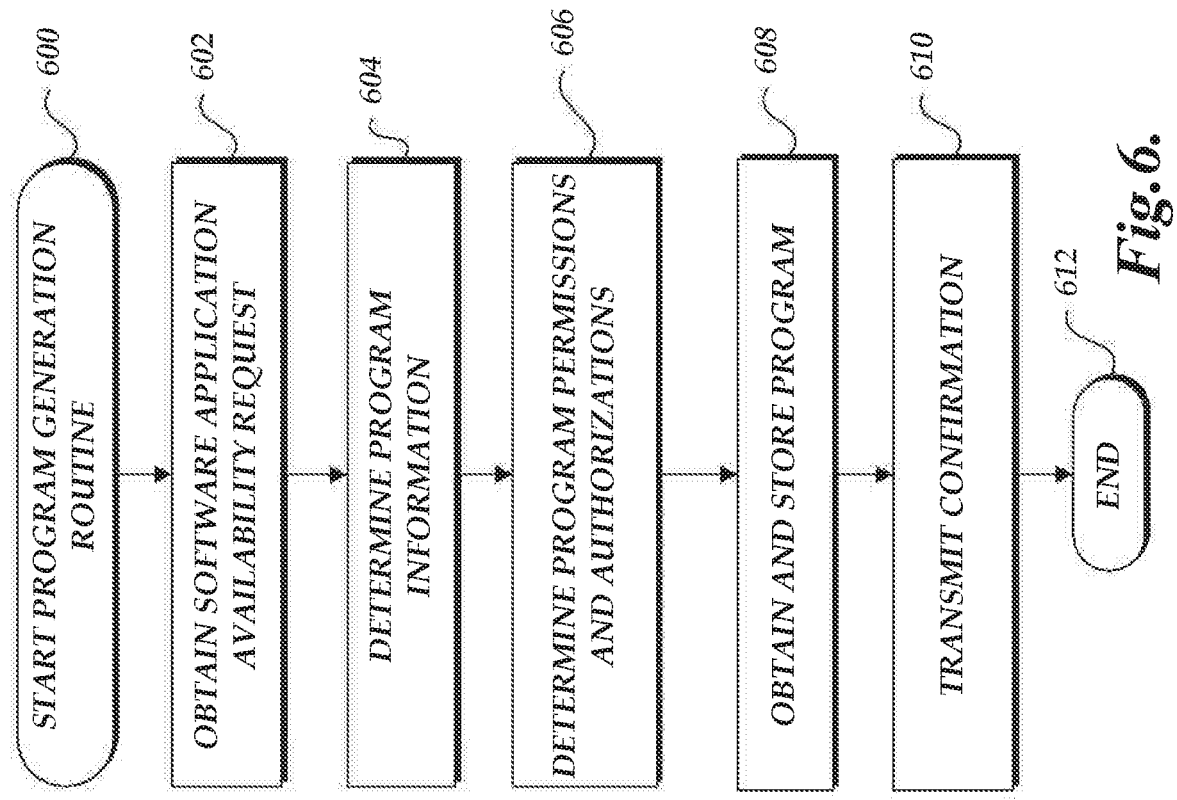
FIG. 6 is a flow diagram of a partner program generation routine implemented by a content management system.

With reference now to FIG. 6, a program generation routine 600 implemented by the content management system 108 will be described. At block 602, the content management system 108 obtains software application program creation request from a user associated with a content provider 104 via the communication network 106. Illustratively, the request may be transmitted by accessing and an interface to be generated on the user client computer. As previously described, the content provider 104 can correspond to various groupings of computing devices, including from partner networks that function as content providers 102. Additionally, as previously described, the content provided by the content provider 104 can correspond to software applications, executable code, and the like.

At block 604, based on the request, the content management system 108 determines, or otherwise identifies, the information associated with the software application that is to be included in the information portal. As previously described, the program information can include information associated with the content. Examples of the type of information that will be included in a new application program can include, but are not limited to, contact information, descriptive information, security information, pricing information, licensing information, identification of particular partner networks, and the like. Additionally, the content management system 108 can obtain licensing information utilized in conjunction with the delivery of the software application to user devices, such as encryption keys, etc.

At block 606, the content management system 108 then determines program permissions for the particular program. In one embodiment the content management system 108 may utilize preconfigured permission information defined according to the content provider 104 (e.g., default permissions attributed to content provider 104 based on initial configuration information made by the content provider). The preconfigured permission information may be stored in the application program data store 118 (FIG. 1). Additionally, the content management system 108 may also obtain specific or additional program permissions from the content provider 104 via a user interface. As previously described, the permission information can define a limited set of information for specific partner network components 102 such that users associated with that specific partner network component 102 can only access a subset of the program information. Additionally, as described above, the user can specify filtering criteria based on individual users, such as criteria based on the characterization of user.

In another aspect, the content management system 108 can also obtain information the users affiliated with specific partner networks 102 may have and the terms of such access. In one example, the information can establish which users or types of users affiliated with the partner network will be able to access software application program. In another example, the information can also establish different subsets of software application program for subset of users affiliated with the partner network. As discussed above, users associated with such partner networks 102 will then be limited as to which software application (or version of a software application) will be provided via the information portal. In a further example, the information can include software manifests or configurations that not identify which software applications are required to be loaded onto a device, which software application are prohibited on a device and which software applications may be optional. The information may be keyed to specific software devices, manufacturers, users, operating systems, and the like. Still further, the information can include a specification of pricing terms or software licenses that dictate the financial considerations to be incurred by the partner network or users of the partner network if the software download occurs. Thus, the partner network system administrator may have ultimate approval or configuration authority for software applications on a user device.

At block 608, the content management system 108 stores the program information. Additionally, at block 610, the content management system 108 can optionally transmit a confirmation to the requesting user or according to specified contact information (e.g., a system administrator identified for the partner network component). The store program will then be made available for access by requesting users as described above with regard to FIG. 5. At block 612, the routine 600 terminates.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method comprising:
   at a content management system, receiving a request from a computing device, the request being for a specific type of content;
   determining an affiliation of the computing device with a partner network;
   forwarding the request to a content provider associated with the partner network;
   making the specific type of content received from the content provider available to the computing device affiliated with the partner network,
   wherein determining the affiliation of the computing device with the partner network includes parsing information associated with a particular user to obtain identification information or parsing a domain name in an email address to obtain affiliation information, forwarding a secure email to the email address, the secure email including a special resource identifier allowing access to the content management system, the special resource identifier including confirmation codes;
   based on the computing device accessing the special resource identifier, verifying the affiliation of the computing device with the partner network;
   obtaining, at the content management system, information about content available to the computing device and conducting an audit and, based on the audit, making the specific type of content received from the content provider available to the computing device;
   displaying, by the content management system, information associated with the requested specific type of content;
   determining, by the content management system, permissions for the requested specific type of content; and
   determining, by the content management system, access rights of the computing device to the requested specific type of content and, based on the access rights, limiting access of the computing device to only a version of the specific type of content.

2. The method of claim 1, wherein conducting an audit includes conducting an audit of software applications and operating systems installed on the computing device and configurations utilized by the computing device.

3. The method of claim 1, wherein displaying, by the content management system, information associated with the requested specific type of content includes displaying contact information, descriptive information, security information, pricing information, licensing information, and identification of particular partner networks.

4. The method of claim 1, wherein determining, by the content management system, permissions for the requested specific type of content includes determining predefined permissions according to the content provider, and specific or additional permissions received from the content provider.

5. A computer system comprising:
   a processor;
   a memory; and code segments, that when executed by the processor, enable the computer system to:

at a content management system, receive a request from a computing device, the request being for a specific type of content;

determine an affiliation of the computing device with a partner network;

forward the request to a content provider associated with the partner network;

make the specific type of content received from the content provider available to the computing device affiliated with the partner network, wherein determining the affiliation of the computing device with the partner network includes parsing information associated with a particular user to obtain identification information or parsing a domain name in an email address to obtain affiliation information, forwarding a secure email to the email address, the secure email including a special resource identifier allowing access to the content management system, the special resource identifier including confirmation codes;

based on the computing device accessing the special resource identifier, verify the affiliation of the computing device with the partner network;

obtain, at the content management system, information about content available to the computing device and conduct an audit and, based on the audit, make the specific type of content received from the content provider available to the computing device;

display, by the content management system, information associated with the requested specific type of content;

determine, by the content management system, permissions for the requested specific type of content; and determine, by the content management system, access rights of the computing device to the requested specific type of content and, based on the access rights, limit access of the computing device to only a version of the specific type of content.

6. The computer system of claim 2, wherein the code segments, that when executed by the processor, enable the computer system to:

conduct an audit of software applications and operating systems installed on the computing device and configurations utilized by the computing device.

7. The computer system of claim 2, wherein the display, by the content management system, of information associated with the requested specific type of content includes a display of contact information, descriptive information, security information, pricing information, licensing information, and identification of particular partner networks.

8. The computer system of claim 2, wherein the determining, by the content management system, permissions for the requested specific type of content includes determining predefined permissions according to the content provider, and specific or additional permissions received from the content provider.

9. A non-transitory computer-readable storage medium having stored thereon computer executable program code which, when executed on a computer system, causes the computer system to perform steps comprising:

at a content management system, receiving a request from a computing device, the request being for a specific type of content;

determining an affiliation of the computing device with a partner network;

forwarding the request to a content provider associated with the partner network;

making the specific type of content received from the content provider available to the computing device affiliated with the partner network, wherein determining the affiliation of the computing device with the partner network includes parsing information associated with a particular user to obtain identification information or parsing a domain name in an email address to obtain affiliation information, forwarding a secure email to the email address, the secure email including a special resource identifier allowing access to the content management system, the special resource identifier including confirmation codes;

based on the computing device accessing the special resource identifier, verifying the affiliation of the computing device with the partner network;

obtaining, at the content management system, information about content available to the computing device and conducting an audit and, based on the audit, making the specific type of content received from the content provider available to the computing device;

displaying, by the content management system, information associated with the requested specific type of content;

determining, by the content management system, permissions for the requested specific type of content; and determining, by the content management system, access rights of the computing device to the requested specific type of content and, based on the access rights, limiting access of the computing device to only a version of the specific type of content.

10. The method of claim 9, wherein conducting an audit includes conducting an audit of software applications and operating systems installed on the computing device and configurations utilized by the computing device.

11. The method of claim 9, wherein displaying, by the content management system, information associated with the requested specific type of content includes displaying contact information, descriptive information, security information, pricing information, licensing information, and identification of particular partner networks.

12. The method of claim 9, wherein determining, by the content management system, permissions for the requested specific type of content includes determining predefined permissions according to the content provider, and specific or additional permissions received from the content provider.

* * * * *